May 28, 1957     G. L. CUNNINGHAM     2,793,934
PREPARATION OF HIGH PURITY LITHIUM CARBONATE
FROM CRUDE AQUEOUS LITHIUM CHLORIDE
Filed Dec. 6, 1952
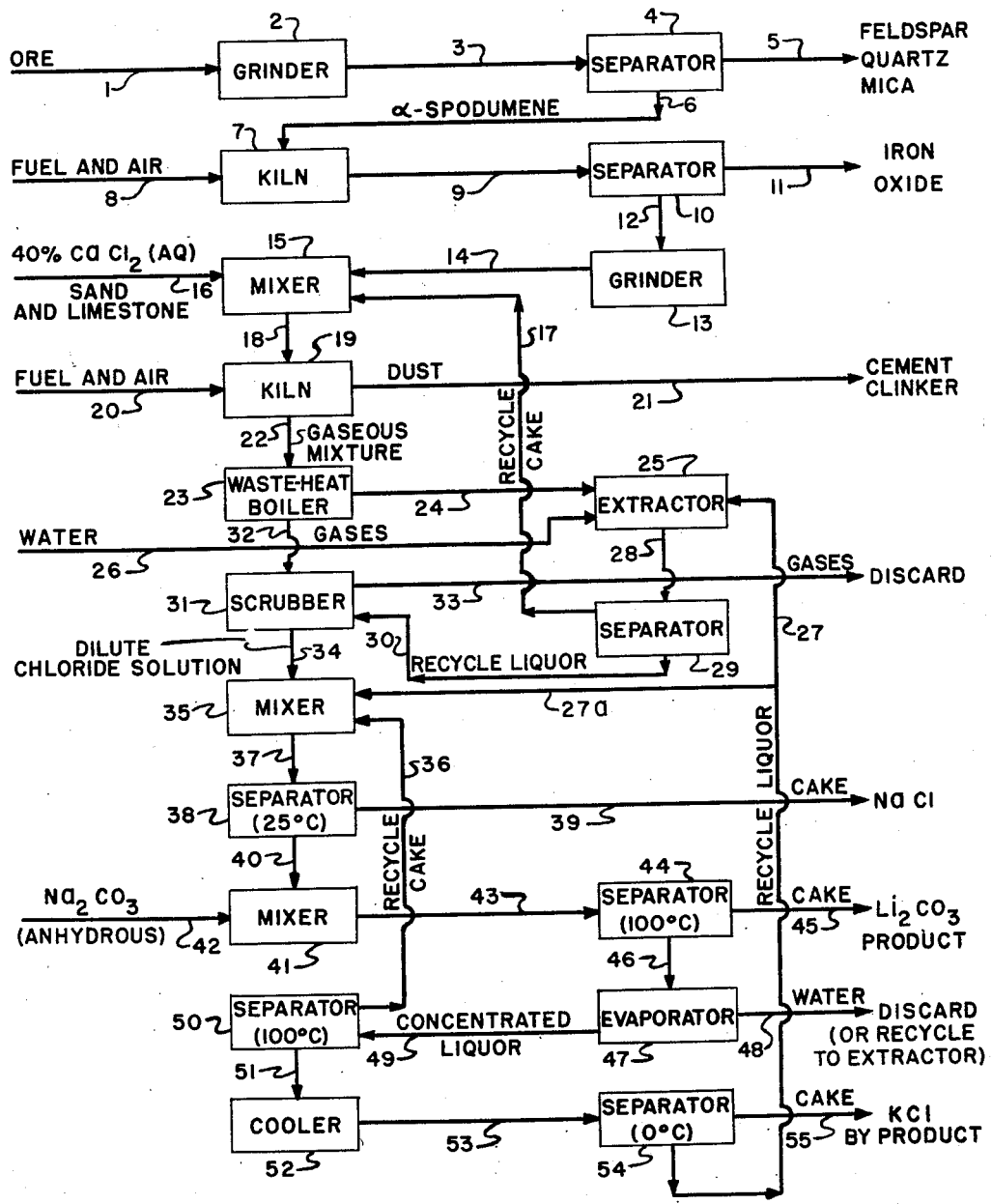
INVENTOR.
GEORGE L. CUNNINGHAM
BY
his ATTORNEY

2,793,934
PREPARATION OF HIGH PURITY LITHIUM CARBONATE FROM CRUDE AQUEOUS LITHIUM CHLORIDE

George L. Cunningham, Cincinnati, Ohio, assignor, by mesne assignments, to Chempatents, Inc., New York, N. Y., a corporation of Delaware Application December 6, 1952, Serial No. 324,550

7 Claims. (Cl. 23—33)

The present invention relates to a process for the preparation of high purity lithium carbonate from crude aqueous lithium chloride solutions containing at least about 2% lithium chloride together with a substantial concentration of potassium chloride or sodium chloride or both, by treating this solution with sodium carbonate, heating to 60 to 100° C., and separating the resulting solid lithium carbonate in a very pure form; and more particularly, the invention relates to such a process wherein the lithium chloride solution is obtained by roasting lithium ore, which preferably contains 2 to 8% lithium oxide, with calcium carbonate and calcium chloride, whereby gaseous crude lithium chloride is evolved, and dissolving the water soluble constituents of the gaseous material in a mother liquor chloride solution, which solution remains after separation of solid lithium carbonate, concentrating and separating at low temperatures any solid alkali metal chlorides.

This invention relates especially to such a process wherein pegmatite ore is coarsely ground, concentrated alpha-spodumene is separated therefrom and converted by roasting with fuel and air to beta-spodumene, optionally iron oxide may be magnetically separated therefrom, and then the beta-spodumene is ground, and roasted with sand, limestone, and calcium chloride to form Portland cement clinker as a solid by-product, and the gaseous mixture containing crude lithium chloride.

Lithium metal and lithium salts have attained a considerable commercial importance, and various methods have been proposed heretofore for the preparation of such salts and also the metal.

In one method, the ore is roasted in the presence of calcium carbonate, and then leached with water, and the resulting crude lithium carbonate solution is converted to lithium chloride by treatment with hydrochloric acid and this chloride is recovered, after intermediate purification steps. In another such method, the lithium ore is subjected to a treatment with sulfuric acids under roasting conditions, whereby the sulfate is formed, and this is recovered as an aqueous solution by leaching with water. In another method, the ore is roasted with potassium sulfate to form lithium sulfate, and this is separated by leaching with water. The lithium sulfate is converted to the lithium carbonate by treatment with sodium carbonate and technical lithium carbonate is recovered therefrom, after extensive intermediate purification steps.

For many purposes, the lithium metal or lithium salts should be of very high purity and in the case of the metal the content of sodium or potassium or both should be very low. Lithium carbonate is perhaps the most important lithium salt, and for certain purposes it should have a very low content of contaminating salts such as the sulfate or the like. The art is confronted with the problem of providing relatively high purity lithium metal and lithium salts, especially the carbonate, in an economic manner.

It has been found in accordance with the invention that high purity lithium carbonate may be obtained in an advantageous manner from an aqueous chloride solution containing lithium chloride together with a substantial concentration of sodium chloride or potassium chloride or both, by treatment with sodium carbonate and recovering the resulting solid lithium carbonate by a separation at 60 to 100° C., concentrating the resulting solution to about 55% by weight total solids concentration, cooling to 0 to 5° C. and separating any resulting solid alkali metal chloride therefrom, and adding the resulting mother liquor to the initial lithium chloride solution. There also may be added to the initial lithium chloride solution crude solid sodium chloride containing a small proportion of lithium carbonate, and then rather pure sodium chloride may be separated from the resulting slurry at 25 to 35° C.

This process may be combined with a process for making Portland cement clinker from pegmatite or spodumene ore, in which combination, the spodumene is roasted together with sand, limestone, and calcium chloride at a temperature of about 1100 to 1200° C. to form by-product cement clinker and evolve crude gaseous lithium chloride containing at least one other alkali metal chloride. The crude chlorides are recovered from the gaseous mixture by dissolving in water or with the mother liquor from the above mentioned alkali metal chloride recovery, and the resulting chloride solution is the initial lithium chloride solution mentioned hereinabove.

The invention is illustrated diagrammatically in the attached drawing.

The objects achieved in accordance with the invention, as described herein, include the provision of a process for preparing high purity lithium carbonate from a crude aqueous chloride solution containing lithium chloride together with a substantial concentration of potassium chloride or sodium chloride or both; the provision of such a process wherein both the potassium chloride and the sodium chloride are separately recovered in substantially pure form; the provision of such a process wherein the initial crude chloride solution is obtained by roasting lithium ore with calcium chloride and evolving therefrom gaseous alkali metal chlorides, and absorbing the alkali metal salts from this gaseous material in water or in the mother liquor from the above described potassium chloride separation; the provision of the latter type process wherein spodumene is the ore and is roasted together with added sand and calcium carbonate, and Portland cement clinker is formed as a by-product; and other objects which will be apparent as details or embodiments of the invention are set forth hereinafter.

In order to facilitate a clear understanding of the invention, the following preferred specific embodiments are described in detail:

Example 1

In a suitable reaction vessel having a corrosion resistant inner surface, such as of glass or metal, equipped with an agitator and indirect coil or jacket heating and cooling means, there is placed a crude aqueous chloride solution containing 19 parts by weight lithium chloride
3 parts sodium chloride
3.2 parts potassium chloride, and
100 parts of water There is added thereto with agitation an aqueous solution containing 4.5 parts potassium chloride,
14 parts sodium chloride
0.33 part lithium carbonate, and
45.4 parts of water, and also crude solid sodium chloride containing 36 parts sodium chloride and 0.72 part lithium carbonate. The resulting slurry is brought to a temperature of 25° to 30° C., e. g. 25° C., and filtered or centrifuged at said temperature, whereby 29.2 parts of rather pure solid sodium chloride is recovered. To the resulting filtrate or mother liquor there is added 23.7 parts of anhydrous sodium carbonate and the resulting mixture is brought up to a temperature of 80 to 100° C., e. g. 100° C., and filtered or centrifuged at said temperature, whereby 16.55 parts of high purity solid lithium carbonate is recovered.

The resulting filtrate or mother liquor is concentrated up to a solids concentration of 55%, e. g. by evaporation of 100 parts of water, and the resulting slurry is filtered at 100° C., whereby there is recovered a crude solid sodium chloride containing 36 parts sodium chloride and 0.72 part lithium carbonate, and this is recycled or added to the next batch of crude aqueous chloride solution. The resulting filtrate or mother liquor is then cooled to 0 to 5° C., e. g. 0° C., and the resulting slurry is filtered or centrifuged at said temperature, whereby 3.2 parts of rather pure solid potassium chloride is recovered. The resulting filtrate or mother liquor contains 4.5 parts potassium chloride
14 parts sodium chloride
0.33 part lithium carbonate, and
45.4 parts of water, and this liquor is recycled or added to the crude aqueous chloride solution in the next batch.

In this manner, substantially all the lithium in the crude chloride solution is converted to and recovered as high purity lithium carbonate; and the potassium and sodium chlorides in said solution are each recovered as substantially pure potassium chloride and sodium chloride containing at most only negligible amounts of any lithium salt.

*Example 2*

In this example, the procedure of Example 1 is combined with a process for preparing high grade Portland cement clinker from pegmatite ores containing spodumene.

A typical pegmatite ore taken from Kings Mountain, North Carolina, has the following composition in weight percent:

|  | Percent |
|---|---|
| Feldspar | 32–36 |
| Quartz | 28–34 |
| Spodumene | 26–32 |
| Mica | 4–6 |
| Casserite (tin ore) | .03 |
| Beryl | .01–.03 | and these materials have the following average analyses:

|  | Spodumene | Feldspar | Quartz | Mica | Composite |
|---|---|---|---|---|---|
| $SiO_2$ | 61.29 | 65.2 | 98.5 | 61.9 | 84.00 |
| $Al_2O_3$ | 30.85 | 22.6 | .4 | 31.1 | 15.02 |
| $Fe_2O_3$ | .20 | .07 | .05 | .3 | .09 |
| CaO | .38 | .42 |  | .2 | .26 |
| MgO | .26 | .18 |  | .2 | .07 |
| $Li_2O$ | 6.84 | .32 |  | .4 | 1.92 |
| $Na_2O$ | .61 | 6.51 |  | .62 | 2.43 |
| $K_2O$ | .82 | 4.32 |  | 6.10 | 1.92 |

This ore is coarsely ground to a particle size of 1 to 2″ (maximum diameter) and then the spodumene is separated therefrom, e. g. by a sink and float separation procedure. The specific gravities of the pegmatite ore constitutents are as follows:

| Quartz | 2.65 to 2.66 |
|---|---|
| Beryl | 2.68 to 2.76 |
| Feldspar | 2.70 |
| Mica | 2.80 to 2.90 |
| Spodumene | 3.1 to 3.2 |
| Casserite | 6.8 to 7.0 | and the first four may be separated therefrom by mixing with an aqueous ferrosilicon slurry having a floating density of about 2.90, and floating these materials off from the spodumene and casserite which settle to the bottom. By this procedure the average lithium content of the concentrate is about three times that of the crude ore, and therefore the use of such a concentrate markedly increases the lithium salt output per roasting step. It also increases the yield of lithium salt relative to the amount of calcium chloride used.

The spodumene in this concentrate is in the hard alpha form, and this is heated to a temperature of 900 to 1100° C. until it is converted to the softer beta form, e. g. by roasting in a usual kiln with powdered coal and air.

The resulting crude beta-spodumene may be passed through a magnetic separator, whereby any iron oxide present is removed, if a white type of cement clinker is desired. It may also be subjected to a light grinding operation to eliminate lumps, and this may precede the iron oxide separation step.

The crude beta-spodumene is mixed with sand, calcium carbonate, and calcium chloride. The sand and calcium carbonate, e. g. well ground limestone, are added to modify the compoisition of the ore residue to provide a good grade of Portland cement clinker, and the calcium carbonate assists in maintaining the reaction mixture in a porous state and in preventing the adherence thereof to the kiln walls. It is preferred to thoroughly mix these ingredients prior to roasting in order to achieve good contact there-between; this mixing may be by means of a wet grinding operation. The resulting mixture having the following composition:

100 parts beta-spodumene
64 parts sand
590 parts limestone, and
29.5 parts calcium chloride (as 40% aqueous solution)

is passed through a rotary cement kiln at about 1100 to 1200° C. Higher temperatures should be avoided since they tend to melt the mix causing it to be less porous and thus less reactive; and lower temperatures, though operative, are less desirable inasmuch as they may not give complete reaction and volatilization of the lithium component. Theoretically, the gaseous material evolved thereby should contain:

19 parts lithium chloride
1.3 parts sodium chloride, and
1.0 part potassium chloride;

in actual operation the recovery is about 90–95% of these amounts.

The by-product Portland cement clinker obtained by this process has the following composition:

|  | Percent |
|---|---|
| $SiO_2$ | 25.00 |
| $Al_2O_3$ | 6.22 |
| CaO | 66.60 |
| $Fe_2O_3$ | .044 |
| MgO | [1]1.03 |

[1] Neglecting MgO in limestone.

and this is a high grade cement clinker having a low magnesium and low iron content. It is converted to pulverulent cement in the usual manner, such as in a rod mill.

The gaseous mixture passed off from the discharge end of the kiln is preferably passed through a heat exchanger such as a waste heat boiler, to recover as much heat as possible for other uses, e. g. in the form of steam. In this step, the dust settles out of the gaseous stream, and contains a major proportion of the volatilized alkali metal chlorides of the gaseous mixture. This dust is mixed and agitated with water or the mother liquor from the potassium chloride recovery step of Example 1, and substantially all the soluble chlorides in the dust are dissolved thereby. Sufficient water is used to keep the slurry in fluid form and prevent the formation of lumps, to avoid trapping or occluding substantial amounts of the alkali metal chlorides. This slurry is filtered or centrifuged, and the separated solid or filter cake is recycled to the cement kiln, or introduced therein with the next batch. Thus, ultimately the entire alkali metal chloride content of the dust is recovered as the chloride.

Alternatively, the precipitated dust may be recycled directly to the cement kiln for reprocessing, thereby eliminating ultimate loss of the alkali metal chlorides therein.

After passing through the heat exchanger, the gaseous mixture is contacted with water, or the filtrate or mother liquor from the dust leaching step to recover any alkali metal salts therein, and the residual gas is discarded; preferably, this is carried out in a countercurrent manner in a jet or spray tower.

Alternatively, the gaseous mixture may be separated into its solid and its gas constituents by means of a Cottrell precipitator, preferably after passing through the heat exchanger; or, instead of passing through the heat exchanger. The effluent gas may be scrubbed, or discarded, and alkali metal chlorides are recovered from the solids, as described hereinabove.

The lithium carbonate product recovered thereby is comparable in quality to that of Example 1; and from the economic viewpoint, this combination process is especially advantageous in view of the high value of the by-product Portland cement clinker obtained thereby, and this is reflected in markedly lowered lithium carbonate cost.

Referring to the accompanying drawing, the ore is passed through line 1 into grinder 2 wherein it is coarsely ground, and then passed through line 3 to separator 4, wherefrom feldspar, quartz, mica, etc., are removed through line 5, and the concentrated alpha spodumene is passed therefrom through line 6 to kiln 7 wherein it is converted by heating at a temperature of 900 to 1100° C. with fuel and air introduced through line 8, to convert it to the beta-spodumene form, and then passed through line 9 to magnetic separator 10 wherefrom the iron oxide is removed through line 11 and the remaining material is passed through line 12 to grinder 13, wherein it is finely ground and then passed through line 14 to mixer 15.

It is mixed therein with sand, limestone, and calcium chloride as 40% aqueous solution, the latter ingredients being introduced through line 16. Separated solid or filter cake may be recycled thereto through line 17. The resulting mixture is passed through line 18 to the kiln 19 wherein it is roasted at a temperature of 1100 to 1200° C. with fuel and air introduced through line 20. The resulting by-product Portland cement clinker is removed therefrom through line 21 and the gaseous mixture evolved is passed therefrom through line 22 to the waste heat boiler 23 and the dust precipitated therein is passed therefrom through line 24 to extractor 25 wherein it is contacted with water introduced through line 26 or recycled mother liquor introduced through line 27, or both, and the resulting mixture is passed through line 28 to separator 29 (filter or wringer) wherein the solid is separated therefrom and recycled through line 17 to the mixer 15. The filtrate or liquor therefrom is passed through line 30 to scrubber 31 wherein it is contacted with gases passed from the waste heat boiler through line 32, and the scrubbed gases are passed therefrom through line 33 and discarded.

The resulting chloride solution is passed therefrom through line 34 to mixer 35 wherein it is mixed with recycled crude solid sodium chloride introduced through line 36, and optionally with mother liquor introduced through line 27a. The resulting mixture is passed through line 37 to separator 38 (filter or wringer) wherein substantially pure solid sodium chloride is separated at 25 to 35° C., and removed through line 39. The resulting filtrate or liquor is passed therefrom through line 40 to mixer 41 wherein it is mixed with anhydrous sodium carbonate introduced through line 42 and brought to a temperature of 80 to 100° C., e. g. 100° C., and the resulting mixture is passed through line 43 to separator 44 (filter or wringer) wherein high purity solid lithium carbonate product is separated at said temperature, and removed through line 45.

The resulting filrate or liquor is passed through line 46 to evaporator 47 wherein it is concentrated to about 55% total solids concentration, e. g. by removal of 100 parts of water, which water is taken off through line 48 and may be discarded (or recycled to the extractor by passing into line 27, not shown). The resulting concentrated liquor is passed therefrom through line 49 to separator 50 (filter or wringer) wherein crude solid sodium chloride containing a small proportion of lithium carbonate is separated at about 100° C. and recycled therefrom through line 36 to mixer 35. The resulting filtrate or liquor is passed therefrom through line 51 to cooler 52 wherein it is brought to a temperature of 0 to 5° C. and passed therefrom through line 53 to separator 54 (filter or wringer) wherein substantially pure solid potassium chloride by-product is separated therefrom at this temperature, and passed therefrom through line 55. The resulting filtrate or liquor is recycled therefrom through line 27 to extractor 25, or optionally through line 27a to mixer 35.

For commercial purposes, it is preferred to operate the process in this continuous manner, recovering substantially all the alkali metal constituents of the ore as the high purity lithium carbonate product, and also the rather pure by-products, sodium chloride and potassium chloride, substantially free of lithium salts; and also recovering valuable Portland cement clinker.

*Example 3*

The procedure of Example 2 is repeated, except that the pegmatite ore is ground and processed directly in the cement kiln, the ore being mixed with amounts of sand, calcium carbonate, and calcium chloride (e. g. as 40% aqueous solution) to provide a cement clinker having substantially the composition of that of Example 2.

During the roasting operation, the alkali metals present are converted to their chlorides, which are evolved in gaseous form. The calcium added as calcium chloride is converted to the oxide, which remains in the cement clinker. The limestone is converted to calcium oxide and carbon dioxide, and calcium aluminates, silicates and alumino-silicates are also formed.

Comparable results to the foregoing are obtained with various modifications, such as the following. The ore used may be any ore which contains an appreciable lithium content, e. g.

| Mineral | Lithia content, in percent by weight |
| --- | --- |
| Spodumene | 2–8 |
| Lepidolite | 2–4 |
| Amblygonite | 8–9 |
| Triphylite | 2–6 |
| Petalite | 2–4 |
| Zinnwaldite | 2–3 |

The lithium content thereof may be converted to lithium chloride by roasting with calcium chloride, and the desired chloride evolved therefrom in gaseous form together with any other alkali metal chloride present.

The fuel may be coal, or oil or natural gas, or the like, and the air may be enriched with oxygen.

The crude aqueous lithium chloride solution may contain about 2 to about 44% lithium chloride, preferably 15 to 30%, at room temperature. The separation of the solid substantially pure sodium chloride may be carried out at a temperature of 15 to 35° C., preferably 25 to 30° C. The separation of the high purity lithium carbonate product is carried out at a temperature in the range of 60 to 100° C., preferably 95 to 100° C. The filtrate or liquor resulting therefrom is concentrated to a total solids content of 40 to 65%, preferably about 50 to 60%; the particular concentration being selected so that substantially no potassium chloride precipitates out of the solution at 90 to 100° C. The crude sodium chloride is separated from the concentrated liquor at a temperature of 90 to 100° C., preferably about 100° C. The substantially pure potassium chloride is separated from the resulting filtrate or liquor at a temperature of 0 to 5° C., preferably 0° C.

The amount of calcium chloride present in the roasting mix is at least stoichiometrically equal to the total combined alkali in the ore, and preferably about 5 to 15% in excess thereof. The amount of sodium carbonate or equivalent carbonate such as potassium carbonate added to the aqueous chloride solution is at least stoichiometrically equal to the combined lithium therein, and preferably about 2 to 5% in excess thereof.

In the combination process, wherein high grade Portland cement clinker is obtained as a by-product, the mixture roasted in the cement kiln should be finely ground (e. g. through 200 mesh Standard sieve, A. C. S. Year Book 1921–2) and provide a clinker having an average composition in percent by weight of 4 to 11% alumina and 19 to 26% silica, the remainder being substantially all calcium oxide except for only minor amounts of magnesia and iron oxide and the like. The weight ratio of silica to the sum of alumina and iron oxide therein is in the range of 1.7 to 2.7, preferably 2.4 to 2.7.

It is indeed surprising that high purity lithium carbonate may be obtained in such an advantageous manner from crude aqueous chloride solutions containing lithium chloride together with a substantial concentration of at least one other alkali metal chloride; and especially that the combination process may be conducted in such an economically advantageous manner, whereby high grade Portland cement clinker is obtained as a by-product, together with the high purity lower cost lithium carbonate product.

Variations and modifications of the invention will be apparent to one skilled in the art in view of the foregoing disclosures, and it is intended to include within the invention all such variations and modifications except as do not come within the scope of the appended claims.

This application is a continuation-in-part of my application Serial No. 103,303, filed July 6, 1949, which has matured into Patent No. 2,627,452.

I claim:

1. In a cyclic process the combination of steps of roasting a lithium ore with calcium carbonate and calcium chloride at a temperature of about 1100 to 1200° C. to evolve lithium containing gaseous materials, forming an aqueous solution of the water-soluble constituents of the evolved gaseous materials, treating said aqueous solution with sodium carbonate, heating the resultant solution at 60 to 100° C. and separating high purity lithium carbonate therefrom, evaporating the remaining solution to approximately 40 to 65% total solids, separating therefrom at about 90 to 100° C. crude solid sodium chloride containing lithium carbonate, recycling said crude solid sodium chloride to the said aqueous solution, cooling the liquor from which the crude solid sodium chloride has been separated at a temperature of about 0 to 5° C., and separating therefrom high purity potassium chloride.

2. In a cyclic process the combination of steps of roasting a spodumene ore with calcium carbonate, sand and calcium chloride at a temperature of about 1100 to 1200° C. to concurrently produce cement clinker and to evolve lithium containing gaseous materials, forming an aqueous solution of the water-soluble constituents of the evolved gaseous materials, treating said aqueous solution with sodium carbonate, heating the resultant solution at 60 to 100° C. and separating high purity lithium carbonate therefrom, evaporating the remaining solution to approximately 40 to 65% total solids, separating therefrom at about 90 to 100° C. crude solid sodium chloride containing lithium carbonate, recycling said crude solid sodium chloride to the said aqueous solution, cooling the liquor from which the crude solid sodium chloride has been separated at a temperature of about 0 to 5° C., and separating therefrom high purity potassium chloride.

3. In a cyclic process the combination of steps of roasting a lithium ore with calcium carbonate and calcium chloride at a temperature of about 1100 to 1200° C. to evolve lithium containing gaseous materials, forming an aqueous solution of the water-soluble constituents of the evolved gaseous materials, separating from said aqueous solution at a temperature of about 25 to 30° C. any solid sodium chloride, treating the solution from which solid sodium chloride has been separated with sodium carbonate, heating the resultant solution at 60 to 100° C., separating high purity lithium carbonate therefrom, evaporating the remaining solution to approximately 40 to 65% total solids, separating therefrom at about 90 to 100° C. crude solid sodium chloride containing lithium carbonate, recycling said crude solid sodium chloride to said aqueous solution, cooling the liquor from which the crude solid sodium chloride has been separated to a temperature of about 0–5° C., separating therefrom high purity potassium chloride and utilizing the resultant liquor in formation of said aqueous solution.

4. In a cyclic process the combination of steps of roasting a spodumene ore with calcium carbonate, sand and calcium chloride at a temperature of about 1100 to 1200° C. to produce concurrently cement clinker and to evolve lithium containing gaseous materials, forming an aqueous solution of the water-soluble constituents of the evolved gaseous materials, separating from said aqueous solution at a temperature of about 25 to 30° C. any solid sodium chloride, treating the solution from which solid sodium chloride has been separated with sodium carbonate, heating the resultant solution at 60 to 100° C., separating high purity lithium carbonate therefrom, evaporating the remaining solution to approximately 40 to 65% solids, separating therefrom at about 90 to 100° C. crude solid sodium chloride containing lithium carbonate, recycling said crude solid sodium chloride to said aqueous solution, cooling the liquor from which the crude solid sodium chloride has been separated to a temperature of about 0–5° C., separating therefrom high purity potassium chloride and utilizing the resultant liquor in formation of said aqueous solution.

5. In a cyclic process the combination of steps of roasting a spodumene ore with calcium carbonate and calcium chloride at a temperature of about 1100 to 1200° C. to evolve lithium containing gaseous materials, forming an aqueous solution of the water-soluble constituents of the evolved gaseous materials, treating said aqueous solution with sodium carbonate, heating the resultant solution to 100° C., separating high purity lithium carbonate therefrom, evaporating the remaining solution to approximately 55% total solids, separating therefrom at about 100° C. crude solid sodium chloride containing lithium carbonate, recycling said crude solid sodium chloride to the said aqueous solution, cooling the liquor from which the crude solid sodium chloride has been separated at a temperature of about 0 to 5° C., and separating therefrom high purity potassium chloride.

6. A process of claim 5 in which the spodumene ore is beta-spodumene which has been obtained by roasting alpha spodumene with air and fuel.

7. In a cyclic process, the combination of steps of roasting a spodumene ore with calcium carbonate and calcium chloride at a temperature of about 1100 to 1200° C. to evolve lithium containing gaseous materials, forming an aqueous solution of the water-soluble constituents of the evolved gaseous materials, separating from said aqueous solution at a temperature of about 25° C. any solid sodium chloride, treating the solution from which solid sodium chloride has been separated with sodium carbonate, heating the resultant solution to about 100° C., separating high purity lithium carbonate therefrom, evaporating the remaining solution to approximately 55% total solids, separating therefrom at about 100° C. crude solid sodium chloride containing lithium carbonate, recycling said crude solid sodium chloride to said aqueous solution, cooling the liquor from which the crude solid sodium chloride has been separated to a temperature of about 0–5° C., separating therefrom high purity potassium chloride and utilizing the resultant liquor in formation of said aqueous solution.

References Cited in the file of this patent

UNITED STATES PATENTS

| | | |
|---|---|---|
| 2,021,987 | Colton | Nov. 26, 1935 |
| 2,044,018 | Rossett et al. | June 16, 1936 |
| 2,413,644 | Nicholson | Dec. 31, 1946 |
| 2,533,246 | Hayes et al. | Dec. 12, 1950 |
| 2,561,439 | Erasmus | July 24, 1951 |

OTHER REFERENCES

Bureau of Mines, March 1946, RI 3848 (pages 2 to 10).
Lea and Desch: "The Chemistry of Cement and Concrete" (1935), pages 21, 24, 124 and 125.